(12) United States Patent
Hymel et al.

(10) Patent No.: US 9,577,419 B2
(45) Date of Patent: Feb. 21, 2017

(54) SHUNT TRIP CONTROL CIRCUITS USING SHUNT TRIP SIGNAL ACCUMULATOR AND METHODS OF OPERATING THE SAME

(71) Applicant: Eaton Corporation, Cleveland, OH (US)

(72) Inventors: Jon E. Hymel, Raleigh, NC (US); Leonard S. Scheuring, Glenshaw, PA (US)

(73) Assignee: Eaton Corporation, Cleveland, OH (US)

( * ) Notice: Subject to any disclaimer, the term of this patent is extended or adjusted under 35 U.S.C. 154(b) by 382 days.

(21) Appl. No.: 14/107,470

(22) Filed: Dec. 16, 2013

(65) Prior Publication Data
US 2015/0171614 A1  Jun. 18, 2015

(51) Int. Cl.
H02H 9/04  (2006.01)
H02H 1/06  (2006.01)
H01H 71/12  (2006.01)
H01H 83/20  (2006.01)

(52) U.S. Cl.
CPC ............. *H02H 1/06* (2013.01); *H01H 71/123* (2013.01); *H01H 83/20* (2013.01)

(58) Field of Classification Search
CPC ............. H02H 3/20; H02H 9/04; H02H 9/041
USPC .......................................................... 361/86
See application file for complete search history.

(56) References Cited

U.S. PATENT DOCUMENTS

| | | | |
|---|---|---|---|
| 4,860,157 A | 8/1989 | Russell | |
| 6,768,284 B2 * | 7/2004 | Lee | H02P 21/36 318/808 |
| 7,081,693 B2 * | 7/2006 | Hamel | B60C 23/0411 307/151 |
| 7,095,208 B2 * | 8/2006 | Kawaji | H02P 27/08 318/438 |
| 7,265,960 B2 * | 9/2007 | Zipagan | H02H 3/04 361/115 |
| 8,421,397 B2 * | 4/2013 | Yu | H02P 29/032 318/778 |
| 8,994,320 B2 * | 3/2015 | Mo | H02P 27/047 318/727 |
| 2005/0270717 A1 * | 12/2005 | Zipagan | H02H 3/04 361/115 |

(Continued)

FOREIGN PATENT DOCUMENTS

EP  2 579 291 A1  4/2013

OTHER PUBLICATIONS

International Search Report and Written Opinion Corresponding to International Application No. PCT/US2014/069432; Date of Mailing: Mar. 19, 2015; 11 Pages.

*Primary Examiner* — Dharti Patel
(74) *Attorney, Agent, or Firm* — Myers Bigel, P.A.

(57) ABSTRACT

Some embodiments of the inventive subject matter provide an apparatus for driving a shunt trip actuator for a circuit breaker or other switch. The apparatus includes an energy storage device and an accumulator circuit configured to store energy in the energy storage device responsive to a shunt trip control signal. The apparatus further includes a detector circuit configured to generate a detection signal responsive to a state of the energy storage device meeting a predetermined criterion and a driver circuit configured to drive the shunt trip actuator using the energy stored in the energy storage device responsive to the detection signal.

20 Claims, 3 Drawing Sheets

(56) References Cited

U.S. PATENT DOCUMENTS

2014/0153140 A1\* 6/2014 Hart .................. H02H 3/202
　　　　　　　　　　　　　　　　　　　　　361/18

\* cited by examiner

SHUNT TRIP CONTROL CIRCUITS USING SHUNT TRIP SIGNAL ACCUMULATOR AND METHODS OF OPERATING THE SAME

BACKGROUND

The inventive subject matter relates to circuit breaker systems and methods and, more particularly, to shunt trip apparatus and methods.

Electric power switches, such as circuit breakers, transfer switches, disconnects and the like, may employ an electrically-activated shunt trip actuators that may be used to trip the operating mechanism of the switch. For example, circuit breakers may have shunt trip actuators that may be driven by control signals generated by external devices, such as fire alarm systems. The shunt trip actuator enables the fire alarm system to trip the circuit breaker to prevent damage and/or alleviate unsafe conditions. The breaker often can be manually reset after tripping.

Shunt trip actuators typically are implemented as flux transfer devices. Such devices use a spring to bias a plunger that engages the operating mechanism of the switch. A permanent magnet is used to counteract the spring force to maintain the plunger in an un-actuated position. A coil is configured to counteract the flux of the permanent magnet such that, when a current is passed through the coil, the permanent magnet field is interrupted, allowing the spring to force the plunger to the actuated position and open the breaker. Shunt trip actuator units typically impose requirements on the signals used to control them, i.e., the control signals have certain voltage and/or current requirements.

SUMMARY

Some embodiments of the inventive subject matter provide an apparatus for driving a shunt trip actuator for a circuit breaker or other switch. The apparatus includes an energy storage device and an accumulator circuit configured to store energy in the energy storage device responsive to a shunt trip control signal. The apparatus further includes a detector circuit configured to generate a detection signal responsive to a state of the energy storage device meeting a predetermined criterion and a driver circuit configured to drive the shunt trip actuator using the energy stored in the energy storage device responsive to the detection signal.

In some embodiments, the energy storage device may include a capacitor and the accumulator circuit may be configured to charge the capacitor responsive to the shunt trip control signal. The detector circuit may be configured to generate the detection signal responsive to a voltage of the capacitor and the driver circuit may be configured to discharge the capacitor to drive the shunt trip actuator responsive to the detection signal.

In further embodiments, the accumulator circuit may include a current regulator circuit configured to control a charging current provided from a source of the shunt trip control signal to the capacitor. The accumulator circuit may further include a rectifier circuit configured to rectify the shunt trip control signal.

In some embodiments, the accumulator circuit may include first and second inputs configured to receive first and second shunt trip control signals, respectively. The accumulator circuit may further include first and second rectifier circuits coupled between the first and second inputs of the accumulator circuit and first and second inputs of the current regulator circuit, respectively. The first and second inputs of the accumulator circuit may support respective first and second voltage ranges.

In further embodiments, the capacitor may be configured to be coupled and decoupled to and from the driver circuit by an auxiliary contact set of a switch actuated by the shunt trip actuator. The capacitor may also be configured to be coupled and decoupled to and from the detector circuit by the auxiliary contact set.

Some embodiments of the inventive subject matter provide a circuit breaker assembly including a circuit breaker, a shunt trip actuator configured to actuate the circuit breaker and a shunt trip control circuit configured to store energy in an energy storage device responsive to a shunt trip control signal and to drive the shunt trip actuator using the stored energy responsive to a state of the energy storage device meeting a predetermined criterion. The shunt trip control circuit may be configured to charge a capacitor responsive to the shunt trip control signal and to discharge the capacitor to drive the shunt trip actuator responsive to a voltage of the capacitor meeting a predetermined criterion.

The shunt trip control circuit may be configured to regulate a charging current delivered to the capacitor from a source of the shunt trip control signal. The shunt trip control circuit may be configured to decouple the capacitor from the shunt trip actuator using an auxiliary contact of the circuit breaker. The shunt trip control circuit may be configured to operate responsive to DC and AC shunt trip control signals. In some embodiments, the shunt trip control circuit may include a capacitor, an accumulator circuit configured to charge the capacitor responsive to the shunt trip control signal, a detector circuit configured to generate a detection signal responsive to a voltage of the capacitor meeting a predetermined criterion and a driver circuit configured to drive the shunt trip actuator from the capacitor responsive to the detection signal.

Some embodiments provide methods of operating a shunt trip actuator. The methods include storing energy in an energy storage device responsive to a shunt trip control signal and driving the shunt trip actuator using the stored energy responsive to a state of the energy storage device meeting a predetermined criterion. Storing energy in an energy storage device responsive to a shunt trip control signal may include storing energy in a capacitor responsive to the shunt trip control signal and driving the shunt trip actuator using the stored energy responsive to a state of the energy storage device meeting a predetermined criterion may include discharging the capacitor to drive the shunt trip actuator responsive to a voltage of the capacitor meeting a predetermined criterion.

DETAILED DESCRIPTION

Figure 1:
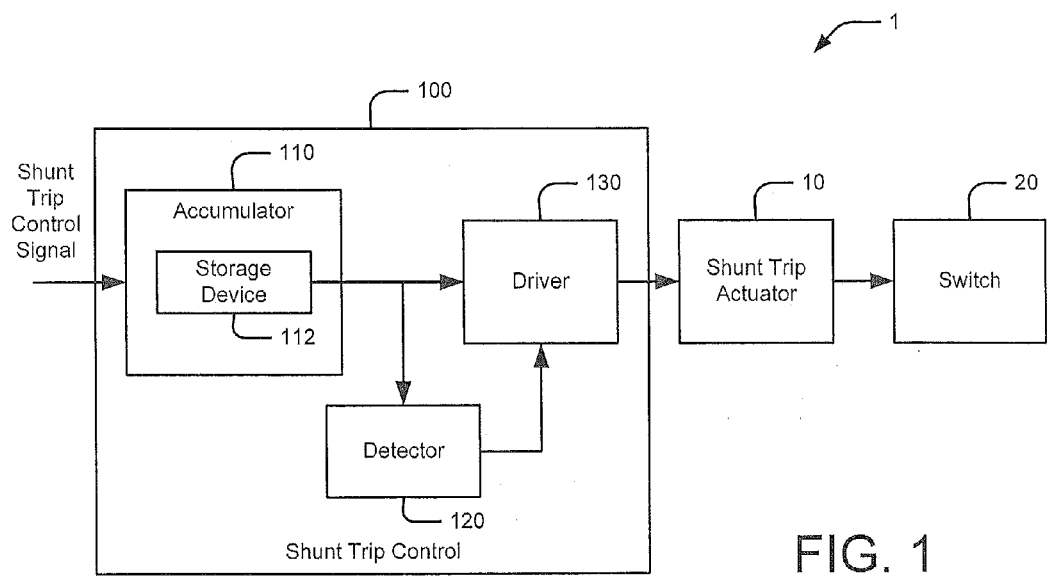
FIG. 1 illustrates a circuit breaker apparatus according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from an inventive realization that a shunt trip actuator for a circuit breaker or other switching device may be adapted for use with a wide variety of different types of shunt trip control signals by using a shunt trip control circuit that accumulates energy in a storage device, such as capacitor, responsive to a shunt control signal. The shunt trip control circuit may drive a shunt trip actuator using the stored energy. In this manner, a circuit breaker or other switching device may be configured for use with shunt trip signals having a variety of different voltage levels and/or waveforms.

FIG. 1 illustrates a circuit breaker apparatus 1 according to some embodiments. The apparatus 1 includes a switch 20 configured to be actuated by a shunt trip actuator 10. The switch 20 may include, for example, one or more sets of contacts and a trip mechanism configured to move the contacts between engaged and disengaged positions. The shunt trip actuator 10 may include a device, such as a flux transfer device, that is configured to actuate the trip mechanism of the switch 20 responsive to an electrical signal applied thereto, e.g., a current passed through a coil of the shunt trip actuator 10.

The circuit breaker apparatus 1 includes a shunt trip control circuit 100 configured to control the shunt trip actuator 10. As further shown, the shunt trip control circuit 100 includes an accumulator circuit 110 configured to store energy in an energy storage device 112 responsive to a shunt trip control signal provided from an external source, e.g., a fire suppression system, building control system or the like. A detector circuit 120 is configured to detect a state of the storage device 112 and to responsively control a driver circuit 130. More particularly, the driver circuit 130 may be configured to drive the shunt trip actuator 10 using energy stored in the energy storage device 112 responsive to a state of the energy storage device 112 meeting a predetermined criterion, e.g., when a state of the energy storage device indicates accumulation of a sufficient amount of energy to drive the shunt trip actuator 10.

Figure 2:
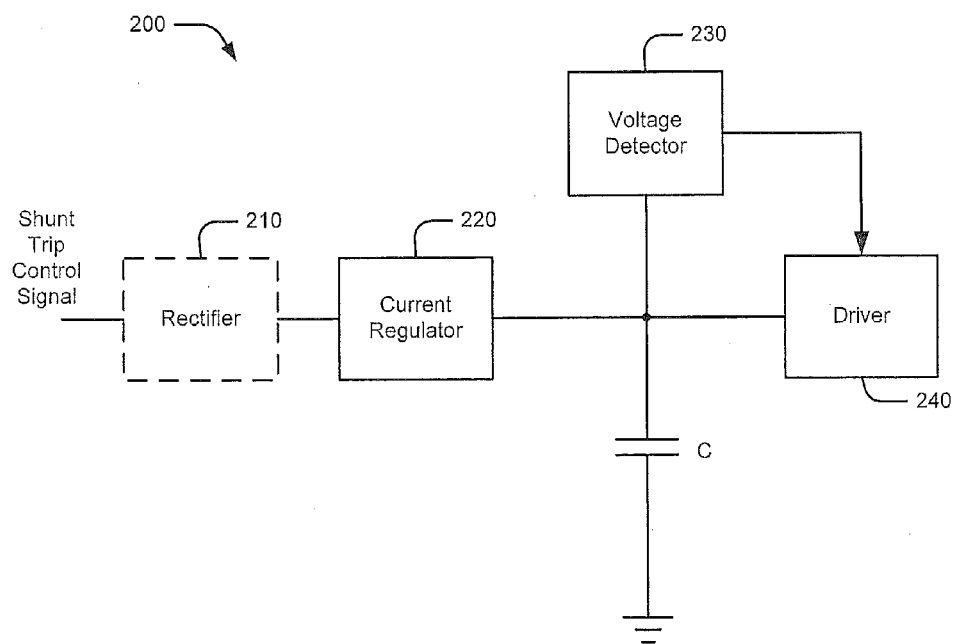
FIG. 2 illustrates a shunt trip control circuit according to some embodiments.

FIG. 2 illustrates a shunt trip control circuit 200 according to further embodiments. The shunt trip control circuit 200 includes an energy storage device in the form of a capacitor C. A current regulator circuit 220 is configured to charge the capacitor C from a shunt trip control signal. A voltage detector circuit 230 is configured to sense a voltage of the capacitor C and to responsively control a driver circuit 240. When the voltage of the capacitor C meets a predetermined criterion, e.g., reaches a predetermined threshold, the voltage detector circuit 230 asserts a detection signal that causes the driver circuit 240 to discharge the capacitor C to drive a shunt trip actuator (not shown in FIG. 2) coupled to the driver circuit 240. As further shown, the shunt trip control circuit 200 may further include a rectifier circuit 210 that is configured to rectify the applied shunt trip control signal before provision to the current regulator circuit 220. In this manner, the shunt trip control circuit 200 may be used with AC or DC shunt trip control signals.

Figure 3:
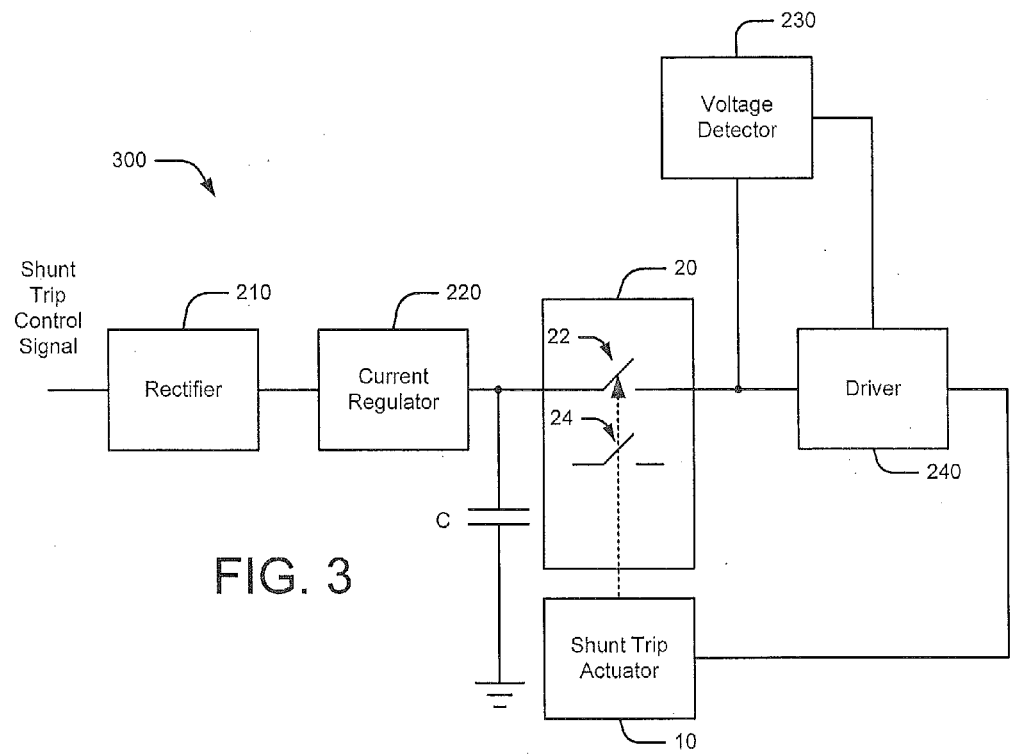
FIG. 3 illustrates a shunt trip control circuit according to further embodiments.
Figure 4:
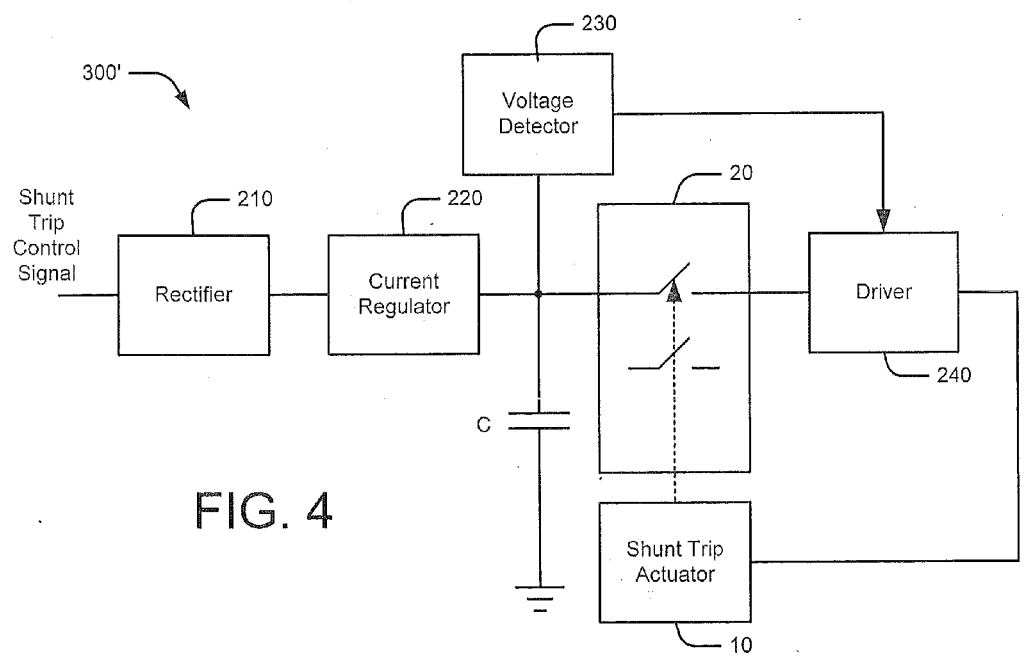
FIG. 4 illustrates a shunt trip control circuit according to still further embodiments.

According to further embodiments, a shunt trip control circuit along the lines illustrated in FIG. 2 may be configured to prevent reclosing of a switch while a shunt trip signal is being asserted. FIG. 3 illustrates a shunt trip control circuit 300 including an energy storage capacitor C, current regulator circuit 220, a voltage detector circuit 230, a driver circuit 240 and an input rectifier circuit 210 along the lines described above. The shunt trip control circuit 300 is further configured to be coupled to an auxiliary contact set 22 of a breaker 20 (or other switching device) controlled by the shunt trip control circuit 300, i.e., the auxiliary contact set 22 is operated by a shunt trip actuator 10 in a ganged fashion with one or more other switches 24 of the breaker 20. The auxiliary contact set 22 is actuated with the breaker 20 opens or closes, with the state of the auxiliary contact set 22 being dependent on the state of the breaker 20 as a whole. As shown in FIG. 3, the auxiliary contact set 22 may couple and decouple the energy storage capacitor C to and from the voltage detector circuit 230 and the driver circuit 240. Following opening of the auxiliary contact set 22 in response to an initial assertion of the shunt trip control signal and subsequent discharge of the capacitor C to drive the shunt trip actuator 10, the energy storage capacitor C may be recharged if the shunt trip control signal is still being asserted. If a user attempts to reclose the breaker 20 in this state, the shunt trip driver circuit 240 will operate again, tripping the breaker 20, thus preventing the switch from remaining closed while the shunt trip signal is still being asserted. It will be understood that arrangements other than that illustrated in FIG. 3 may be used. For example, FIG. 4 illustrates a shunt trip control circuit 300' configured to connect an auxiliary contact set 22 between the energy storage capacitor C and the driver circuit 240.

Figure 5:
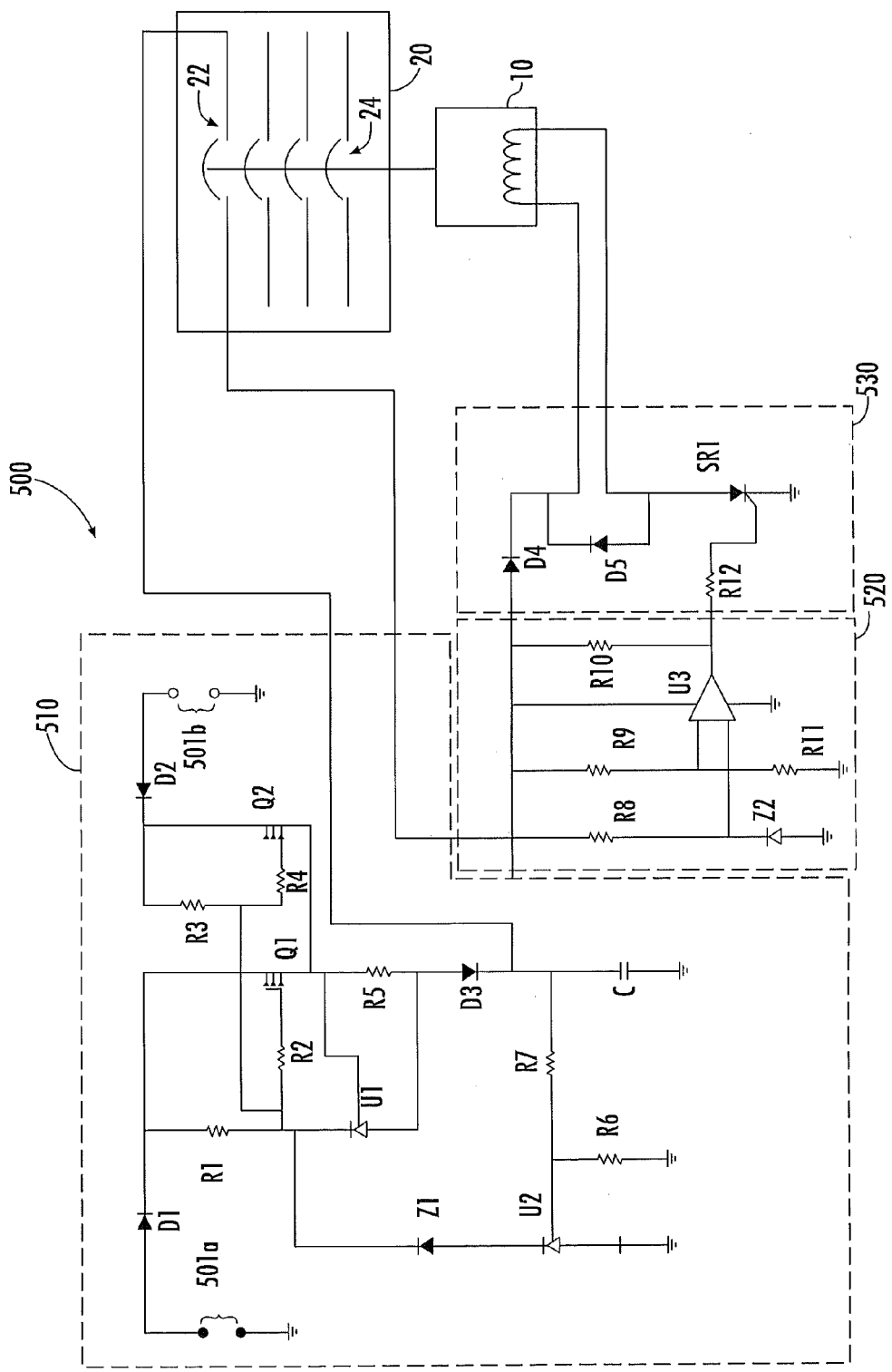
FIG. 5 illustrates a circuit breaker apparatus according to some embodiments.

FIG. 5 illustrates an exemplary implementation of a shunt trip control circuit 500 according to further embodiments. The shunt trip control circuit 500 includes an accumulator circuit 510 having first and second shunt trip control signal inputs 501a, 501b. Rectifier circuits comprising respective diodes D1, D2 are coupled to the respective shunt trip control signal inputs 501a, 501b. A current regulator circuit is coupled to the rectifier circuits and includes transistors Q1, Q2, a diode D3, first and second shunt voltage regulators U1, U2, a zener diode Z1 and resistors R1, R2, R3, R4, R5, R6, R7. The first shunt voltage regulator U1 (e.g., a Texas Instruments TL431 Shunt Voltage Regulator) is configured to regulate current passing through the first transistor Q1 or the second transistor Q2 to a storage capacitor C. The second shunt voltage regulator U2 is configured to terminate current flow to the storage capacitor C when a voltage across the capacitor C exceeds a certain voltage threshold. The current regulator circuit is configured through the selection of the resistors R1, R3 such that the first and second shunt trip control inputs 501a, 501b support different shunt trip control signals from different voltage ranges.

The shunt trip control circuit 500 further includes a voltage detector circuit 520, which is configured to be coupled to the storage capacitor C via an auxiliary contact set 22 of a switch 20. The voltage detector circuit 520 includes a comparator U3, a zener diode Z2 and resistors R8, R9, R10, R11. The comparator U3 generates a detection signal responsive to a comparison of a voltage derived from voltage of the storage capacitor C to a reference voltage generated by the zener diode Z2.

The detection signal generated by the voltage detector circuit 520 is provided to a driver circuit 530, which is also coupled to the storage capacitor C via the auxiliary contact set 22. The driver circuit 530 includes diodes D4, D5, a resistor R12 and an SCR SR1. The SCR SR1 controls a current path through a coil of a shunt trip actuator 10, which is operatively associated with the switch 20.

When a shunt trip signal is asserted at one of the first and second shunt trip signal inputs 501a, 501b, the accumulator circuit 510 accumulates charge in the storage capacitor C. When the voltage across the capacitor C reaches a predetermined threshold, the comparator U3 of the voltage detector circuit 520 asserts the detection signal. This turns on the SCR SR1 and causes actuation of the shunt trip actuator 10, opening the switch 20. If a user attempts to manually reclose the switch 20 while the shunt trip control signal is asserted, the auxiliary contact set 22 will close and cause current to again flow from the storage capacitor to the shunt trip actuator 10, thus causing to switch 20 to trip again.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus for driving a shunt trip actuator that trips a switch mechanism, the apparatus comprising:
an energy storage device;
an accumulator circuit configured to store energy in the energy storage device responsive to a shunt trip control signal;
a detector circuit configured to generate a detection signal responsive to a state of the energy storage device meeting a predetermined criterion; and
a driver circuit configured to drive the shunt trip actuator using the energy stored in the energy storage device responsive to the detection signal to trip the switch mechanism.

2. The apparatus of claim 1:
wherein the energy storage device comprises a capacitor;
wherein the accumulator circuit is configured to charge the capacitor responsive to the shunt trip control signal;
wherein the detector circuit is configured to generate the detection signal responsive to a voltage of the capacitor; and wherein the driver circuit is configured to discharge the capacitor responsive to the detection signal to drive the shunt trip actuator.

3. The apparatus of claim 1, wherein the accumulator circuit comprises a current regulator circuit configured to control a charging current provided from a source of the shunt trip control signal to the capacitor.

4. The apparatus of claim 3, wherein the accumulator circuit further comprises a rectifier circuit configured to rectify the shunt trip control signal.

5. The apparatus of claim 3, wherein the accumulator circuit comprises first and second inputs configured to receive first and second shunt trip control signals, respectively.

6. The apparatus of claim 5, wherein the accumulator circuit further comprises first and second rectifier circuits coupled between the first and second inputs of the accumulator circuit and first and second inputs of the current regulator circuit, respectively.

7. The apparatus of claim 5, wherein the first and second inputs support respective first and second voltage ranges.

8. The apparatus of claim 2, wherein the capacitor is configured to be coupled and decoupled to and from the driver circuit by an auxiliary contact set of the switch actuated by the shunt trip actuator.

9. The apparatus of claim 8, wherein the capacitor is configured to be coupled and decoupled to and from the detector circuit by the auxiliary contact set.

10. A circuit breaker assembly comprising the apparatus of claim 1.

11. A circuit breaker assembly comprising:
a circuit breaker;
a shunt trip actuator configured to actuate a switch mechanism of the circuit breaker; and
a shunt trip control circuit configured to store energy in an energy storage device responsive to a shunt trip control signal and to drive the shunt trip actuator using the stored energy responsive to a state of the energy storage device meeting a predetermined criterion.

12. The circuit breaker assembly of claim 11, wherein the shunt trip control circuit is configured to charge a capacitor responsive to the shunt trip control signal and to discharge the capacitor to drive the shunt trip actuator responsive to a voltage of the capacitor meeting a predetermined criterion.

13. The circuit breaker of claim 12, wherein the shunt trip control circuit is configured to regulate a charging current delivered to the capacitor from a source of the shunt trip control signal.

14. The circuit breaker of claim 12, wherein the shunt trip control circuit is configured to decouple the capacitor from the shunt trip actuator using an auxiliary contact set of the circuit breaker.

15. The circuit breaker of claim 11, wherein the shunt trip control circuit is configured to operate responsive to DC and AC shunt trip control signals.

16. The circuit breaker of claim 11, wherein the shunt trip control circuit comprises:
a capacitor;
an accumulator configured to charge the capacitor responsive to the shunt trip control signal;
a detector circuit configured to generate a detection signal responsive to a voltage of the capacitor meeting a predetermined criterion; and
a driver circuit configured to drive the shunt trip actuator from the capacitor responsive to the detection signal.

17. A method of operating a shunt trip actuator, the method comprising:

storing energy in an energy storage device responsive to a shunt trip control signal; and driving the shunt trip actuator using the stored energy responsive to a state of the energy storage device meeting a predetermined criterion to trip a switch mechanism.

18. The method of claim 17:

wherein storing energy in an energy storage device responsive to a shunt trip control signal comprises storing energy in a capacitor responsive to the shunt trip control signal; and wherein driving the shunt trip actuator using the stored energy responsive to a state of the energy storage device meeting a predetermined criterion comprises discharging the capacitor to drive the shunt trip actuator responsive to a voltage of the capacitor meeting a predetermined criterion.

19. The method of claim 18, wherein discharging the capacitor to drive the shunt trip actuator responsive to a voltage of the capacitor meeting a predetermined criterion is followed by decoupling the capacitor from the shunt trip actuator using an auxiliary contact of a circuitry breaker driven by the shunt trip actuator.

20. The method of claim 17, wherein the energy stored in the energy storage device is provided from a source of the shunt trip control signal.

\* \* \* \* \*